United States Patent [19]
Lohr

[11] Patent Number: 5,377,774
[45] Date of Patent: Jan. 3, 1995

[54] VARIABLE SPEED DRIVE SYSTEM

[75] Inventor: Thomas H. Lohr, Richmond, Ind.

[73] Assignee: Hoffco, Inc., Richmond, Ind.

[21] Appl. No.: 13,623

[22] Filed: Feb. 4, 1993

[51] Int. Cl.$^6$ .............................................. B62D 51/04
[52] U.S. Cl. .................................. 180/19.3; 180/19.1; 474/8; 474/14
[58] Field of Search .................... 180/19.1, 19.2, 19.3, 180/337, 364, 366; 474/14, 8

[56] References Cited

U.S. PATENT DOCUMENTS

| | | |
|---|---|---|
| 1,501,705 | 7/1924 | Decoux . |
| 2,134,159 | 10/1938 | Von Hofe . |
| 2,491,248 | 12/1949 | Carroll . |
| 2,523,171 | 9/1950 | Willey ................................ 180/19.1 |
| 2,572,109 | 10/1951 | Coates ................................ 180/19.1 |
| 2,591,746 | 4/1952 | Tom ................................... 180/19.1 |
| 2,740,246 | 4/1956 | Smith et al. ........................ 180/19.1 |
| 2,824,457 | 2/1958 | Norton . |
| 2,918,775 | 12/1959 | Hollerith et al. .................. 180/19.1 |
| 2,995,295 | 8/1961 | Day . |
| 3,015,237 | 1/1962 | Musgrave . |
| 3,130,532 | 4/1964 | Ottosen ............................... 180/19.1 |
| 3,853,197 | 12/1974 | Quiram ............................... 180/19.1 |
| 4,094,204 | 6/1978 | Yamamoto et al. . |
| 4,099,737 | 7/1978 | Waugh . |
| 4,117,652 | 10/1978 | Jones et al. . |
| 4,364,735 | 12/1982 | Plamper et al. . |
| 4,429,758 | 2/1984 | Meshulam .......................... 180/19.3 |
| 4,766,640 | 8/1988 | Martin et al. ...................... 180/19.3 |
| 5,316,097 | 5/1994 | Meyer et al. ....................... 180/19.1 |

FOREIGN PATENT DOCUMENTS 466263  7/1950  Canada .............................. 180/19.1

Primary Examiner—Mitchell J. Hill
Attorney, Agent, or Firm—Barnes & Thornburg

[57] ABSTRACT

A variable speed drive system for use with a self-propelled device is coupled by a belt to an engine which is mounted to the device. The variable speed drive system includes a variable pitch pulley held in spaced-apart relation to the drive shaft by a fixture and rotates about the drive shaft between a first position proximal to the engine and a second position distal to the engine. In the first position, the drive system is disengaged from the engine and the speed of the self-propelled device is zero, the belt being slack and providing no drive force to the drive system. In the second position, the drive system is moved a maximum amount about the drive shaft and is positioned to achieve a maximum speed. The drive system can also assume any intermediate position between the first and second positions, with the speed of the self-propelled device being determined by the amount of movement about the drive shaft toward the second position. A speed control lever and a control cable assembly are included for limiting the amount of movement of the drive system about the drive shaft to control the speed of the self-propelled device 25 Claims, 4 Drawing Sheets

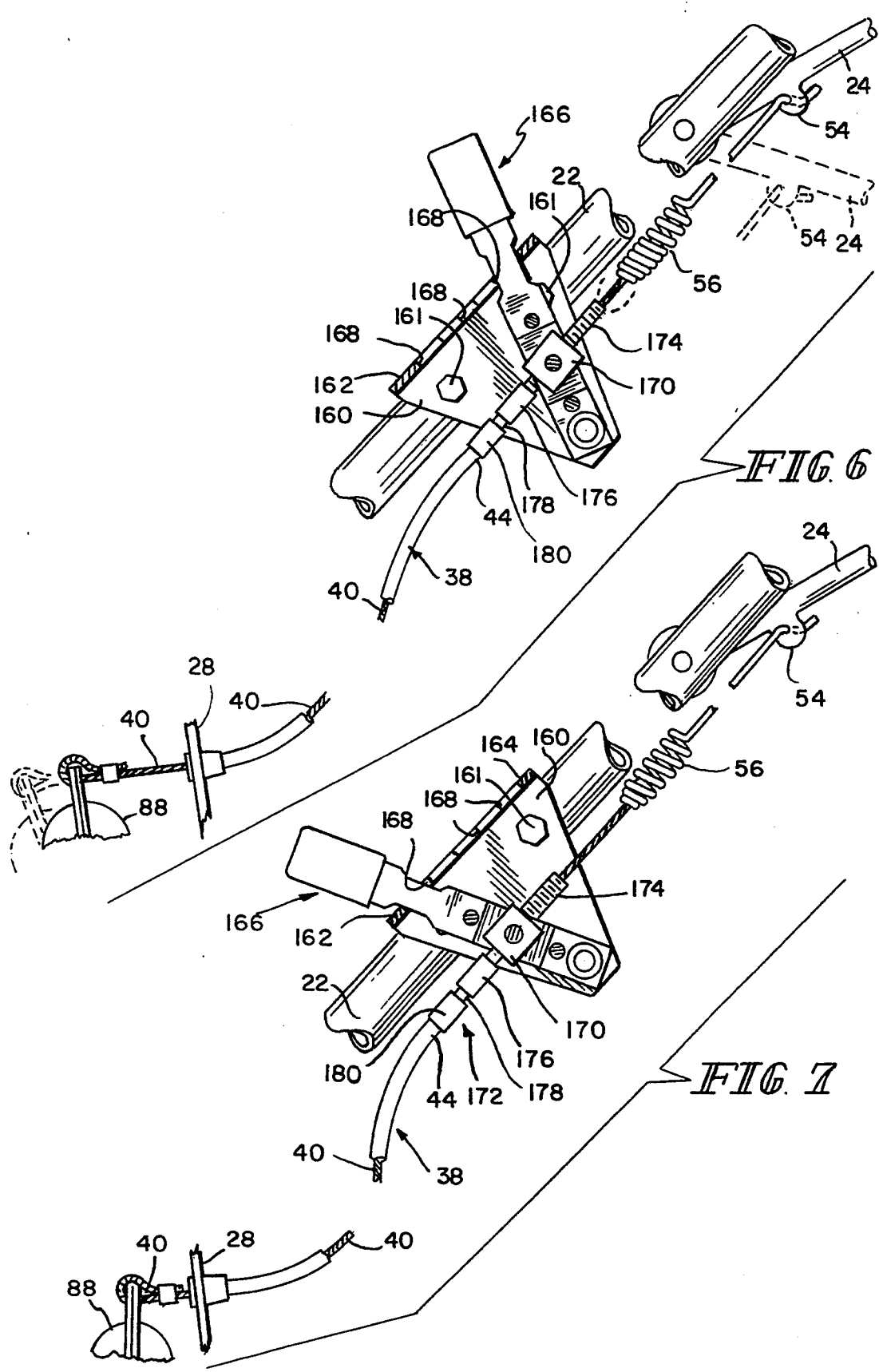

VARIABLE SPEED DRIVE SYSTEM

BACKGROUND AND SUMMARY OF THE INVENTION

The present invention relates to drive systems, and particularly to variable speed drive systems. More particularly, the invention relates to variable speed drive systems for use with self-propelled, walk-behind devices such as lawn mowers.

In a single speed self-propelled lawn mower, the engine is generally indirectly coupled to a set of drive wheels to propel the lawn mower at a single speed, which is usually related to the engine speed. Typically, a drive pulley is mounted to an output shaft of the engine and a belt or other transmission mechanism connects the drive pulley to a drive shaft which in turn rotates the drive wheels. When the drive system is engaged, the lawn mower automatically assumes the single speed. When the drive system is disengaged, the lawn mower stops.

If any variable speed control exists, it is typically accomplished by changing the engine speed. Unfortunately, this can be disadvantageous in situations where the operator might prefer a higher engine speed and a lower lawn mower speed, such as when cutting tall grass. If the engine speed is increased to provide for increased speed of the cutting elements and better cutting, the lawn mower moves faster and thereby negates the benefit of the increased speed of the cutting elements. Moreover, for some people, the single speed may be too fast or too slow and, therefore, an uncomfortable speed for walking behind a lawn mower. A variable speed mechanism that would allow the operator to adjust the speed of the lawn mower to suit the individual needs of the operator and separately control engine speed would be an improvement over conventional single speed drive systems.

Variable speed drives for use with self-propelled lawn mowers are known. See, for example, U.S. Pat. No. 2,740,246 to Smith et al., U.S. Pat. No. 3,015,237 to Musgrave, and U.S. Pat. No. 4,117,652 to Jones et al.

In variable speed, self-propelled lawn mowers, two separate mechanisms are generally used to operate the lawn mower. An engagement mechanism is actuated to engage the drive system to begin propelling the lawn mower and a separate speed control mechanism is utilized to adjust the speed of the lawn mower. Moreover, conventional variable speed drive systems utilize complex and costly multiple gear sets or friction drive wheels and a clutch. A variable speed drive system that eliminates the complex and costly mechanisms yet uses a single mechanism to set the desired speed and to engage the drive system would provide a substantial improvement over conventional drive systems in the form of reduced manufacturing costs and maintenance requirements.

A mechanism that would allow any operator to preset a personally comfortable lawn mower speed to be automatically assumed when the drive system is engaged would be advantageous. Such a drive system that also allowed for temporarily reducing the speed as necessary, for instance to move around obstacles or the like, would further improve conventional self-propelled lawn mower drive systems.

The present invention provides a variable speed drive system for use with a self propelled device having an engine mounted to a frame and a pair of drive wheels coupled to a drive shaft for propelling the lawn mower. The system includes a variable pitch pulley that is coupled by a belt to a drive pulley mounted on an output shaft of the engine. The variable pitch pulley is coupled to the drive shaft by a chain housing fixture. The fixture positions the pulley in spaced-apart relation to the drive shaft, and moves about the drive shaft between an engaged position and a disengaged position.

In the disengaged position, the belt connecting the drive pulley to the variable pitch pulley is slack and does not drive the variable pitch pulley. Moving the fixture about the drive shaft toward an engaged position removes the slack from the belt connecting the drive pulley to the variable pitch pulley. As the fixture is moved further toward the fully engaged position, tension in the belt urges the belt radially inwardly toward the center of the variable pitch pulley. As the pitch of the pulley changes in response to the inward movement of the belt, the effective radius of the variable pitch pulley decreases, thereby increasing the speed of rotation of the variable pitch pulley relative to the drive pulley. Thus, the pitch of the pulley changes in response to movement of the fixture about the drive shaft and the speed of the self-propelled device changes in response to the changes in the pitch of the variable pitch pulley. Consequently, moving the fixture about the drive shaft directly changes the speed of the lawn mower.

The variable pitch pulley is connected to a drive sprocket and the drive shaft is connected to a driven sprocket. An endless chain engages the drive sprocket and the driven sprocket while the fixture retains the drive sprocket and driven sprocket in spaced-apart relation to each other. The fixture includes a clam shell housing for enclosing the chain and the sprockets while maintaining the drive sprocket and the driven sprocket in spaced-apart relation to each other.

The self-propelled device also has a handle, with an engagement bail coupled thereto, and a bracket mounted to the frame and positioned in space-apart relation to the fixture. The bail is movable between an engaged position adjacent the handle and a disengaged position. The bail is connected by a spring and cable to the fixture so that movement of the bail toward the engaged position moves the fixture and variable pitch pulley about the drive shaft toward the engaged position.

A speed control lever, also coupled to the handle, is positioned to allow an operator to limit the amount of movement of the cable in response to movement of the bail to the engaged position. Limiting the amount of movement of the cable directly limits the amount of movement of the variable pitch pulley and the fixture about the drive shaft and therefore limits the speed of the self-propelled device. A spring connected to the cable and to the bail extends as necessary to allow the cable to stop at any desired position while permitting the bail to reach the engaged position.

The cable connecting the bail to the fixture is surrounded by, and longitudinally movable through, an outer cable housing. In one embodiment of the invention, one end of the outer housing is attached to the bracket and the other end is attached to the handle. According to one aspect of the invention, the speed control lever interferes with a stopper formed on the cable to limit the amount of cable movement available in response to movement of the bail toward the engaged position. When the speed control lever interferes with the stopper, the cable stops moving. The spring extends to allow the bail to move any remaining distance to the engaged position. Since the speed of the self-propelled device is directly related to the amount of movement of the variable pitch pulley and the fixture about the drive shaft, limiting the amount of movement of the cable directly determines the maximum speed of the lawn mower by limiting the amount of fixture movement about the drive shaft in response to movement of the bail to the engaged position.

In another embodiment of the invention, one end of outer cable housing is attached to the bracket and the second end is coupled to the speed control lever. Moving the speed control lever repositions the second end of the outer cable housing and therefore determines the amount of cable movement available in response to movement of the bail to the engaged position. Thus, when the second end of the outer housing is moved toward the bail, there is some movement of the bail before the bail applies tension to the cable, and the bail reaches the engaged position before the maximum cable runout is achieved. With less cable runout in response to the movement of the bail to the engaged position, the fixture moves less than the full amount about the drive shaft and a less than maximum speed is achieved.

When the second end of the outer housing is moved away from the bail, an increased amount of cable movement is available in response to movement of the bail to the engaged position. Tension is applied to the cable as soon as the bail begins to move. The maximum amount of cable runout is achieved at some point before the bail reaches the engaged position, and the spring deforms to allow the bail to reach the engaged position. Full runout of the cable in response to movement of the bail to the engaged position provides full movement of the fixture about the drive shaft and thus maximum speed is achieved. Since the speed of the self-propelled device is directly related to the amount of movement of the variable pitch pulley and the fixture about the drive shaft, the positioning of the outer housing determines the maximum speed of the self-propelled device by determining the amount of cable movement (and therefore fixture movement) available in response to movement of the bail to the engaged position.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 6 shows an alternative embodiment of the speed control mechanism positioned for minimum speed; and FIG. 7 shows the alternative embodiment of FIG. 6 with the speed control mechanism positioned for maximum speed.

DETAILED DESCRIPTION OF THE DRAWINGS

Although the invention will be particularly described with regard to a self-propelled lawn mower, it will be appreciated that the invention is not limited to a lawn mower application. The variable speed drive system of the present invention is equally applicable to many other self-propelled products such as, for example, floor scrubbers, walk-behind vacuums, and line marking equipment.

Figure 1:
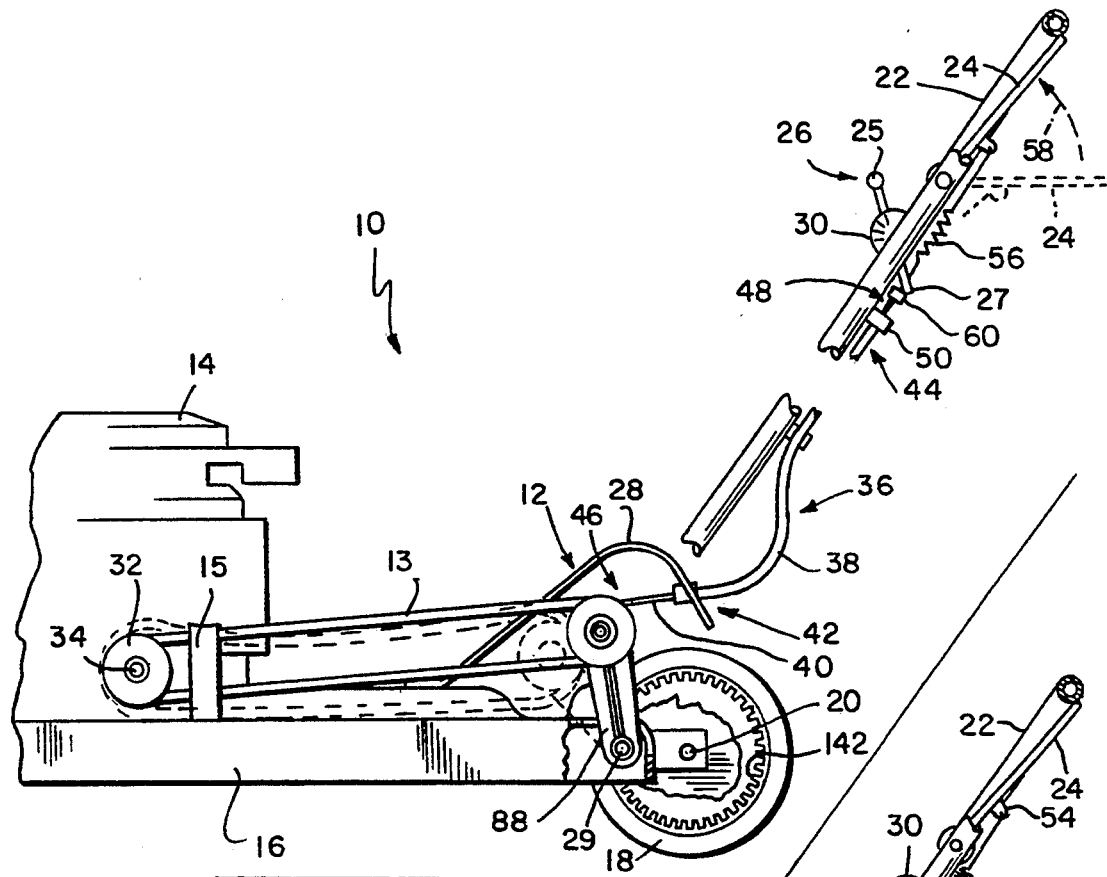
FIG. 1 is a partial side view of a lawn mower incorporating the variable speed drive system of the present invention where the drive system is shown in a disengaged position (in dotted lines) and an engaged position (in solid lines), a speed control lever in position for minimum speed, and an engagement bail shown in a disengaged position (in dotted lines) and an engaged position (in solid lines) which correspond to the disengaged and engaged positions, respectively, of the variable speed drive system.
Figure 2:
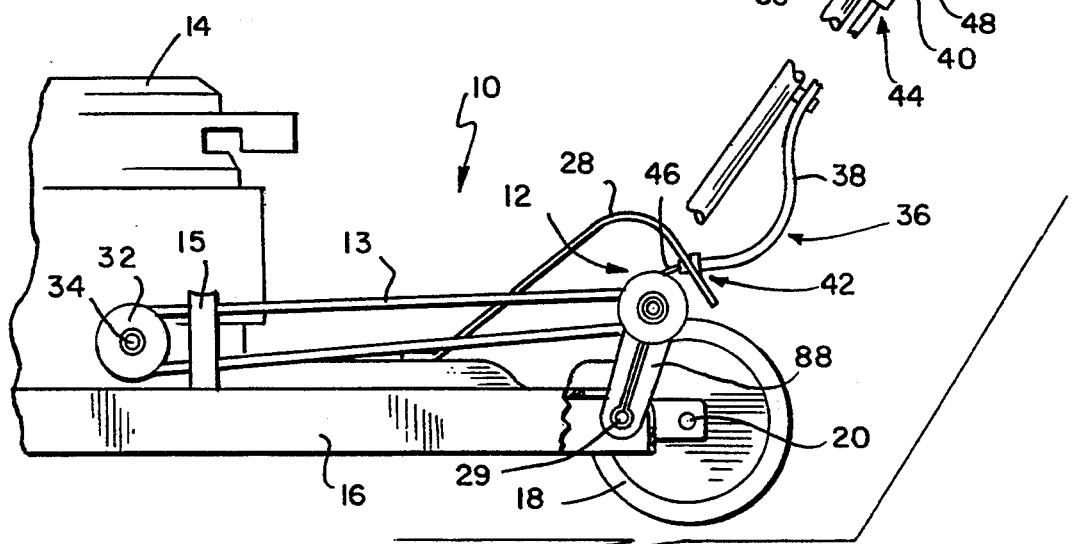
FIG. 2 is a partial side view similar to FIG. 1 showing the engagement bail in the fully engaged position, the variable speed drive system in the fully engaged position, and the speed control lever positioned for maximum speed.

FIGS. 1 and 2 show a partial side view of a lawn mower 10 incorporating the variable speed drive system 12 of the present invention. The variable speed drive system 12 is coupled by a belt 13 to an engine 14 which is mounted on a deck 16. A drive wheel 18 is coupled to the deck 16 by axles 20 and driven by drive shaft 29. A height adjuster (not shown) can be coupled to the deck 16 and axles 20 to provide means for changing the depth of cut of the lawn mower 10. A handle 22, incorporating an engagement bail 24 and a speed control lever 26, is coupled to the rear area of the deck 16. A bracket 28 is attached to the deck 16 and positioned in spaced-apart relation to the variable speed drive system 12. It will be appreciated that in other applications the engine, handle, and axles may be coupled to a frame rather than a deck.

The variable speed drive system 12 moves about the drive shaft 29 between a first position proximal to the engine 14 (in dotted lines in FIG. 1) and a second position distal to the engine 14 (shown in FIG. 2). In the first position, the drive system 12 is disengaged from the engine and the lawn mower speed is zero, the belt 13 being slack and providing no drive force to the drive system 12. In the second position, the drive system 12 is moved a maximum amount about the drive shaft 29 and is positioned to achieve a maximum speed. The drive system 12 can also assume any intermediate position between the first and second positions, with the speed of the lawn mower being determined by the amount of movement about the drive shaft 29 toward the second position—the greater the amount of movement toward the second position, the greater the lawn mower speed.

A control cable assembly 36 has an outer cable housing 38 surrounding an inner cable 40. The lower end 42 of the outer housing 38 is coupled to the bracket 28 and the upper end 44 of the outer housing 38 is coupled to the handle 22 at a connector 50 which is rigidly attached to the handle 22. The inner cable 40, which is longitudinally movable inside the outer housing 38, is attached at its lower end 46 to the variable speed drive system 12 and at its upper end 48 to one end of a spring 56. The other end of the spring 56 is coupled to a finger 54 formed on the engagement bail 24. Thus, the engagement bail 24 is directly connected to the variable speed drive system 12. As the engagement bail 24 is moved in direction of arrow 58, it pulls the inner cable 40 through the outer housing 38 to move the drive system 12 about the drive shaft 29 toward the second position (as shown in FIG. 2).

A bracket 30 is rigidly attached to the handle 22. A speed control lever 26 is rotatably coupled to the bracket 30 and is provided with a locking mechanism for holding the speed control lever 26 in a selected position. The locking mechanism could, for example, be a friction lock or a plurality of notches formed in the bracket 30. Thus, the speed control lever 26 can be moved to, and retained in, a desired position.

The speed control lever 26 includes a knob 25 at one end and a fork 27 on the other end, the fork 27 being positioned to contact a stopper 60 formed on the upper end 48 of the inner cable 40. The inner cable 40 is positioned for movement between the tynes of the fork 27 formed on the speed control lever 26. Each time the bail 24 moves toward the engaged position, it pulls the inner cable 40 until the stopper 60 contacts the fork 27. However, the stopper 60 is sized to prevent passage between the tynes of the fork 27. Thus, it will be appreciated that locking the speed control lever 26 in the desired position serves two functions. First, it limits the movement of the inner cable 40 and, consequently, the speed of the lawn mower. Second, it ensures that each time the bail 24 is moved to the engaged position, the inner cable 40 is limited to the same amount of movement and the same speed is resumed by the lawn mower. It will be understood that other arrangements are possible to restrict the movement of the inner cable 40. For example, the inner cable 40 could be adapted to pass through an aperture formed in the end of the speed control lever 26 opposite the knob 25. The stopper 60 can be positioned on the inner cable 40 as necessary to interfere with the aperture formed in the speed control lever 26 to restrict further movement of the inner cable 40.

In FIG. 1, the speed control lever 26 is positioned to allow minimum movement of the inner cable 40 in response to movement of the bail 24, and hence minimum movement of the drive system 12 about the drive shaft 29. The spring 56 extends as necessary to allow the bail 24 to reach the second position, shown in solid lines in FIG. 1, even though the restricted movement of the inner cable 40 might otherwise stop further movement of the bail. By restricting the amount of movement of the drive system 12 toward the second position, the speed control lever 56 limits the speed of the lawn mower when the bail is in the engaged position.

In FIG. 2, the speed control lever 26 is positioned to allow maximum extension of the inner cable 40 relative to the outer housing 38. Consequently, when the bail 24 is moved to the engaged position adjacent to handle 22, it pulls the inner cable 40 to move the variable speed drive system 12 about the drive shaft 29 to the second position. The spring 56 is only minimally extended, if at all. Thus, as can be seen by comparing FIGS. 1-2, the position of the speed control lever 26 determines the amount of movement of the variable speed drive system 12 about the drive shaft 29, and therefore the speed of the lawn mower 10. Moreover, the use of the control cable assembly 36 allows the use of a single cable to engage the drive system 12 and to set a drive speed.

Figure 3:
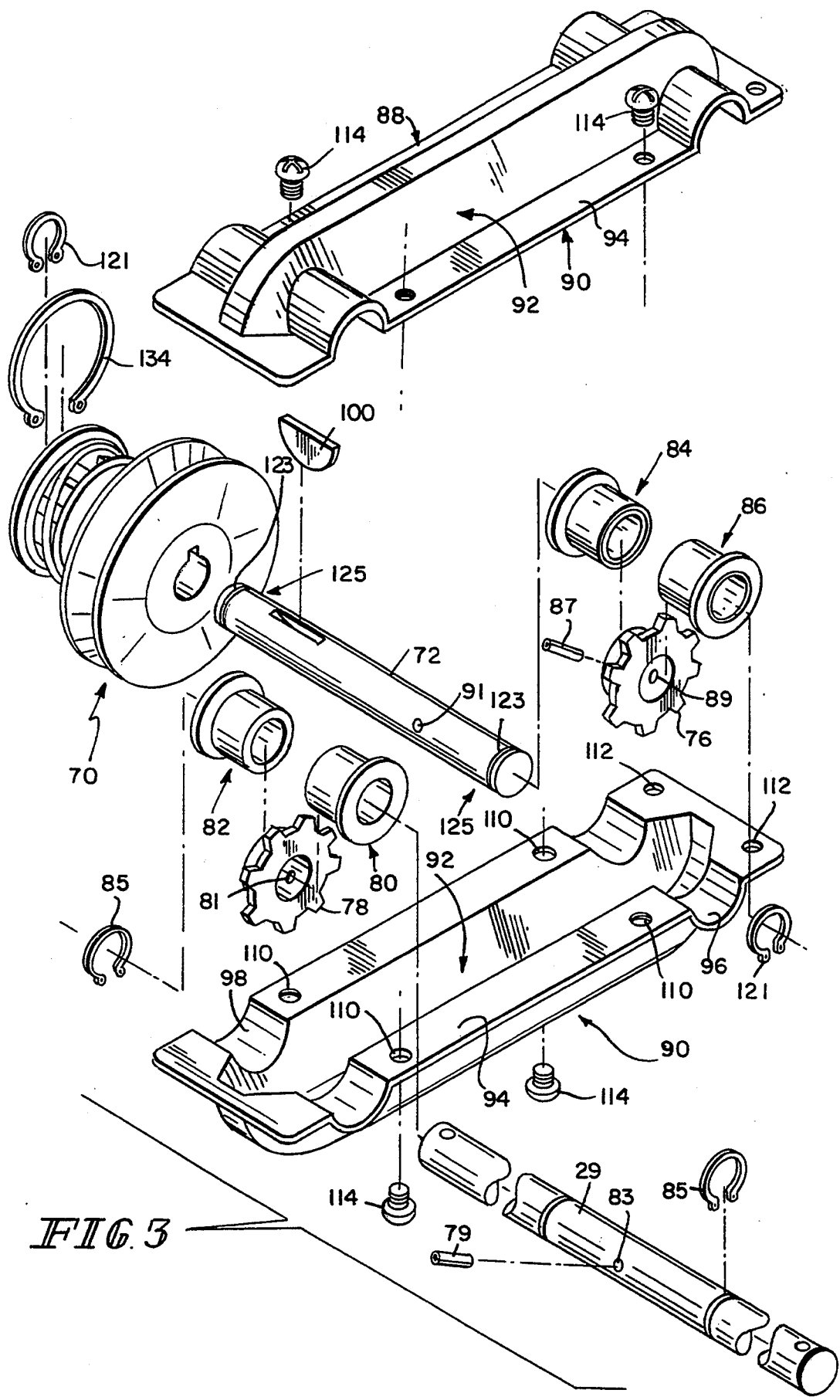
FIG. 3 is an exploded perspective view showing the relationship between the variable pitch pulley, the sprockets, and the housing.

FIG. 3 is an exploded perspective view of the variable speed drive system 12. The drive system 12 includes a variable pitch pulley 70, an intermediate shaft 72, sprockets 76 and 78, bearings 80, 82, 84, and 86, and a housing fixture 88. The housing fixture 88 includes substantially identical, reversible, clam shell halves 90. Each clam shell half 90 includes a longitudinally extending central trough 92 having a perimetral flange 94 extending outwardly therefrom. The trough 92 and flange 94 are formed to include transverse channels 96 and 98.

The variable pitch pulley 70 is attached by woodruff key 100 to the intermediate shaft 72. The intermediate shaft 72 fits into a first bearing 84, a drive sprocket 76, and a second bearing 86. The drive sprocket 76 is pinned to the intermediate shaft 72 by inserting pin 87 into aperture 89 in drive sprocket 76 and aperture 91 in the intermediate shaft 72. The shaft 72 and the bearings 84 and 86 are positioned in the transverse channel 96 so as to center the drive sprocket 76 in the trough 92 and held in position in the transverse channel 96 by retaining rings 121.

A drive shaft 29 is inserted through a third bearing 80, a driven sprocket 78, and a fourth bearing 82. The sprocket 78 is pinned to the drive shaft 29 by inserting pin 79 into aperture 81 in driven sprocket 78 and aperture 83 in the drive shaft 29. The drive shaft 29 and the bearings 80 and 82 are positioned in the transverse channel 98 so as to center the driven sprocket 78 in the trough 92 and held in position in the transverse channel 98 by retaining rings 85. An endless chain 102 (FIGS. 4-5) engages the sprockets 76 and 78 to provide a direct drive connection between the intermediate shaft 72 and the drive shaft 29. It will be appreciated that a system of gears and a cog belt, or any other art recognized power transmission mechanism, may be used to couple the intermediate shaft 72 and the drive shaft 29.

A plurality of apertures 110 are formed in the flange 94 between the channels 96 and 98. A pair of cable-receiving apertures 112 are formed in the flange 94 between the channel 96 and the end of the fixture 88 proximal thereto. When the drive system 12 is to be assembled, the clam shell halves 90 are aligned in registry. Four self-tapping screws 114 are inserted into the apertures 110 to fasten the clam shell halves 90 together along the flanges 94 to provide a contaminant-free trough 92 for the endless chain 102 and sprockets 76 and 78.

Figures 4, 5:
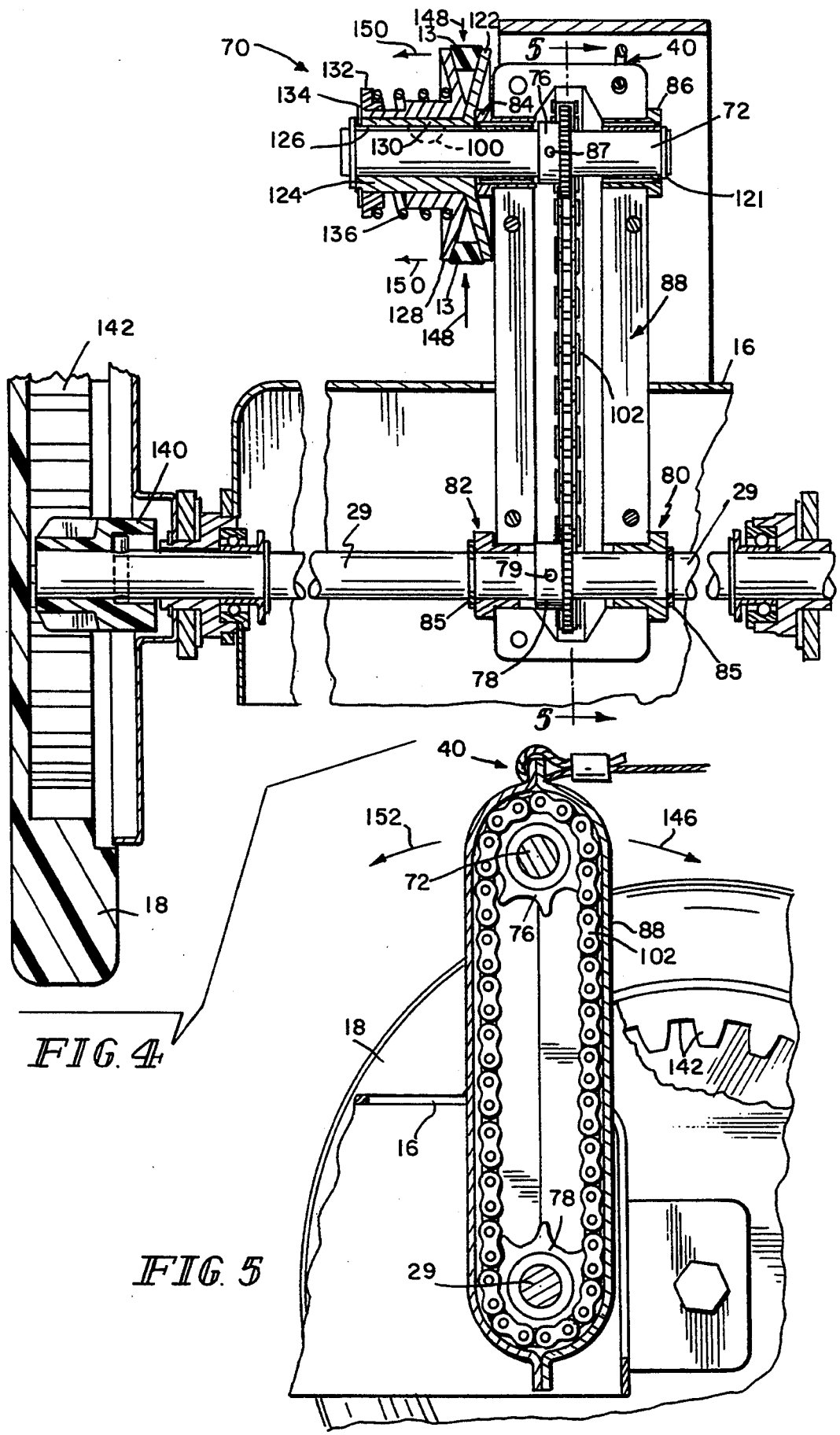
FIG. 4 is a partial sectional view of the variable speed drive system showing a variable pitch pulley coupled to a drive shaft by sprockets and a chain.
FIG. 5 is a sectional view taken along lines 5—5 of FIG. 4 showing the spacial relationship between the sprockets and chain, the lawn mower deck, and the drive wheel.

As shown in FIG. 4, the variable pitch pulley 70 includes a fixed sheave 122 that extends radially outwardly, at an obtuse angle, from an externally splined shaft 124. The splined shaft 124 has an internal bore 126 which is sized to journal the intermediate shaft 72. The fixed sheave 122 is positioned axially adjacent the fixture 88. Retaining rings 121 engage retaining ring grooves 123 (FIG. 3) formed in the end portions 125 of the intermediate shaft 72 to retain the fixed sheave 122 and the fixture 88 in position. A woodruff key 100 rotationally locks the splined shaft 124 to the intermediate shaft 72.

A movable sheave 128 has an internal bore 130 having internal splines complementary to the splined shaft 124. Thus, the movable sheave 128 moves axially along the splined shaft 124. An end plate 132 is positioned at the end of the splined shaft 124 and held in position by a retaining ring 134, such as a snap ring or similar device. A spring 136 is positioned between the end plate 132 and the movable sheave 128, urging the movable sheave 128 into a position abutting the fixed sheave 122.

When the bail 24 is moved in direction of arrow 58 (FIG. 1), the inner cable 40 moves the housing fixture 88 about the drive shaft 29 in the direction of arrow 146 (FIG. 5). Movement of the fixture 88 in the direction of arrow 146 applies tension to the belt 13. As the tension in the belt 13 increases, the belt 13 is urged radially inwardly on the variable pitch pulley 70 in the direction of arrows 148 (FIG. 4). As the belt 13 moves radially inwardly, it pushes the movable sheave 128, against the force of the spring 136, in the direction of arrows 150 (FIG. 4), thereby allowing the belt 13 to move progressively radially inwardly. As the belt 13 moves radially inwardly, the radius of the pulley 70 is effectively decreased, thereby providing for an increased rate of rotation of the pulley 70 relative to the rate of rotation of the drive pulley 32 (FIG. 1).

As the bail 24 is released, tension in the belt 13 causes the fixture 88 to move about the drive shaft 29 in the direction of arrow 152 (FIG. 5), thereby reducing the speed of the lawn mower 10. As the fixture 88 moves in the direction of arrow 152, tension in the belt decreases and the spring 136 urges the movable sheave 128 in the direction opposite to arrows 150 to a position abutting the fixed sheave 122. As the movable sheave 128 moves toward abutment with the fixed sheave 122, the belt 13 is pushed radially outwardly, thereby effectively increasing the radius of the variable pitch pulley 70, and reducing the rate of rotation of the pulley 70 relative to the drive pulley 32 (FIG. 1).

Because the variable pitch pulley 70 is directly coupled to the drive shaft 29 by the sprockets 76 and 78 and the endless chain 102, an increase or decrease in the rate of the rotation of the variable pitch pulley 70 increases or decreases the rate of the rotation of the drive shaft 29 accordingly. A drive pinion gear 140 is attached to the drive shaft 29 and is positioned to engage an internal gear 142 formed on the inside of the drive wheel 18. Thus, as the drive shaft 78 rotates faster or slower in response to an increase or decrease in the rate of rotation of the variable pitch pulley 70, the pinion 76 likewise rotates faster or slower, thereby changing the speed of the drive wheel 18. This arrangement advantageously allows an operator to partially release the bail 24 and thereby reduce the speed of the lawn mower without stopping the lawn mower. Thus, the operator can temporarily slow down in order, for example, to move around obstacles.

An alternative embodiment of the speed control mechanism is shown in FIGS. 6–7. A triangular bracket 160 is rigidly attached to the handle 22 by bolts 161 positioned at the ends of the base of the triangle 160. A flange 162 is formed in the base of the triangular bracket 160 to extend orthogonally from the plane of the triangular bracket 160 and includes a slot 164 extending substantially along the length of the base of the triangle. The speed control lever 166 is rotatably attached to the triangular bracket 160 at the apex of the triangle and positioned to extend through the slot and beyond the flange 162. In addition to limiting the amount of movement of the speed control lever 166, the slot includes a plurality of notches 168 to form stop positions for the speed control lever 166. The notches 168 provide a fast and easy way to positively select a particular speed that is comfortable for the operator. It will be understood that the function of the notches 168 could also be accomplished by other mechanisms, such as, for example, using a twist in the speed control lever 166 to engage sawteeth formed in one edge of the slot.

A threaded block 170 is pivotably coupled to the speed control lever 166. An adjusting mechanism 172 is coupled to the outer cable housing 38 and the threaded block 170. The adjusting mechanism 172 includes a threaded portion 174 that threadingly engages the threaded block 170, a knurled knob portion 176 rigidly coupled to the threaded portion 174, and a reduced diameter portion 178 rigidly coupled to the knurled knob portion 176. A collar 180 is attached to the outer cable housing 38 and is crimped to retain the reduced diameter portion of the adjusting mechanism 172 while allowing the adjusting mechanism 172 to freely swivel in the collar 180. The adjusting mechanism 172 is useful for adjusting production tolerances and for fine adjustment of the speed when the speed control lever 166 is positioned in a notch.

The outer housing 38 and the inner cable 40 are of fixed length. When the drive system 12 is in the first position (in dotted lines in FIG. 1), the upper end 48 of the inner cable 40 extends beyond the upper end 44 of the outer housing 38 by a predetermined amount. When the drive system 12 is moved toward the second position (FIG. 2), the upper end 48 of the inner cable 40 extends an additional amount beyond the upper end 44 of the outer housing 38. The maximum of additional extension of the inner cable 40 beyond the outer housing 38 is equal to the distance that the drive system 12 moved between the first and second positions. If the drive system 12 moves to an intermediate position (shown in solid lines if FIG. 1), the available additional extension of the inner cable 40 will be reduced from the maximum.

Regardless of the amount of additional extension of the inner cable 40 beyond the upper end 44 of the outer housing 38, the movement of the bail 24 to the engaged position will pull the spring 56 an amount equal to the distance that the finger 54 moves in the direction parallel to the handle 22. If the distance traveled by the finger 54 exceeds the maximum amount of available inner cable 40 extension, the inner cable 40 will extend the maximum amount and the spring 56 will take up the difference. In that case, the drive system 12 is moved about the drive shaft 29 to the second position, and maximum lawn mower speed is achieved.

If the upper end 44 of the outer housing 38 is positioned close enough the bail 24 so that movement of the finger 54 is insufficient to pull the inner cable 40 to the maximum extension, the drive system 12 will be moved to an intermediate position (in solid lines in FIG. 1), and a lesser lawn mower speed will be achieved.

For example, in FIG. 6, the speed control lever 166 is in the minimum speed position. In this position, the upper end 44 of the cable housing 38 is moved as close as possible to the bail 24. In this position, the inner cable 40 is loosely connected to the spring (or the spring is limp). The loose connection allows some movement of the finger 54 before tension is applied to the inner cable 40. Thus, the finger 54 is able to travel its maximum distance before the maximum cable extension is achieved. Consequently, the fixture 88 moves to an intermediate position and the lawn mower achieves less than the maximum speed.

Compare FIG. 6 to FIG. 7, wherein the upper end 44 of the cable housing 38 is positioned as far away from the bail 24 as possible. In the position shown in FIG. 7, the inner cable 40 and the spring 56 are taut and tension is applied to the inner cable 40 as soon as the bail 24 begins to move. The maximum amount of cable extension is achieved at some point before the finger 54 travels its maximum distance. At that point, the spring 56 deforms to allow the bail 24 to reach the engaged position. Thus, the inner cable 40 extends the maximum amount possible in response to movement of the bail 24 to the engaged position, and the inner cable 40 pulls the fixture 88 about the drive shaft 29 to the second position, and thus maximum speed is achieved.

Although the invention has been described in detail with reference to a certain preferred embodiment, variations and modifications exist within the scope and spirit of the invention as described and defined in the following claims.

I claim:

1. A variable speed drive system for a self-propelled device having a frame, an engine coupled to the frame, a drive pulley rotated by the engine, a handle coupled to the frame, a drive wheel assembly coupled to the frame for propelling the self-propelled device, and a bail pivotably coupled to the handle for movement between an engine-idling position away from the handle and a device-moving position adjacent to the handle, the system comprising
    a variable pitch pulley,
    shaft means for rotatably supporting the variable pitch pulley,
    a drive belt engaging the drive pulley and the variable pitch pulley,
    means for turning the drive wheel assembly to propel the self-propelled device in response to rotation of the variable pitch pulley, the turning means including an endless chain engaging the shaft means and the drive wheel assembly and lying in tension, and
    means for moving the shaft means and the variable pitch pulley relative to the frame from a disengaged position lying a first distance away from the drive pulley and relaxing tension on the drive belt engaging the drive pulley and the variable pitch pulley to block rotation of the variable pitch pulley in response to rotation of the drive pulley by the engine to an engaged position lying a greater second distance away from the drive pulley and tensioning the drive belt to cause rotation of the variable pitch pulley in response to rotation of the drive pulley by the engine in response to movement of the bail from the engine-idling position to the device-moving position without varying tension applied to the endless chain turning the drive wheel assembly in response to rotation of the variable pitch pulley, the moving means being coupled to the bail for movement therewith relative to the frame.

2. The system of claim 1, wherein the moving means includes a fixture having first and second ends, the shaft means is coupled to the first end of the fixture, the moving means further includes pivot means for pivotably coupling the second end of the fixture to the frame, the pivot means includes a drive shaft coupled to the second end of the fixture and to the drive wheel assembly, and the endless chain engages the drive shaft and pivots with the fixture about the drive shaft.

3. The system of claim 2, wherein the fixture is formed to include an interior region and the endless chain is positioned to lie in the interior region.

4. The system of claim 3, wherein the shaft means includes an intermediate shaft mounted for rotation to the first end of the fixture and a drive sprocket, the intermediate shaft includes an exterior portion located outside of the interior region of the fixture and an interior portion located inside the interior region of the fixture, the variable pitch pulley is mounted on the exterior portion, and the drive sprocket is mounted on the interior portion and arranged to engage the endless chain.

5. The system of claim 2, wherein the fixture includes a first clamshell half formed to include a longitudinally extending first central trough, a first top transverse channel intersecting the first central trough, and a first bottom transverse channel intersecting the first central trough and lying in spaced-apart relation to the first top transverse channel, the fixture further includes a second clamshell half formed to include a longitudinally extending second central trough, a second top transverse channel intersecting the second central trough, and a second bottom transverse channel intersecting the second central trough and lying in spaced-apart relation to the second top transverse channel, and the first and second clamshell halves are coupled together to trap the endless chain in the first and second central troughs and to position a portion of the shaft means in the first and second top transverse channels and a portion of the drive shaft in the first and second bottom transverse channels.

6. The system of claim 5, wherein the shaft means includes an intermediate shaft positioned to extend through the first and second top transverse channels and a drive sprocket coupled to the drive shaft and positioned to lie in the first and second central troughs and engage the endless chain.

7. The system of claim 6, wherein the intermediate shaft includes an exterior portion located outside of the first and second top transverse channels and an interior portion having a first side part located inside the first and second top transverse channels, a second side part located inside the first and second top transverse channels, a central part interconnecting the first and second side parts and lying in the first and second central trough, the variable pitch pulley is mounted on the exterior portion, and the drive sprocket is mounted on the central part of the interior portion.

8. The system of claim 2, wherein the moving means further includes a control cable connected to the fixture and a tension spring interconnecting the control cable and the bail.

9. The system of claim 8, wherein the moving means further includes speed control means for selectively limiting movement of the control cable relative to the handle and the speed control means is coupled to the handle and to the control cable.

10. The system of claim 1, wherein the moving means includes a hollow fixture formed to include an interior region containing the endless chain.

11. The system of claim 10, wherein the hollow fixture is pivotably coupled to the frame to pivot relative to the frame during movement of the shaft means and the variable pitch pulley between said disengaged position and said engaged position.

12. The system of claim 11, wherein the shaft means includes an intermediate shaft mounted for rotation to the fixture and a drive sprocket mounted on the intermediate shaft and positioned in the interior region of the hollow fixture to engage the endless chain.

13. The system of claim 10, wherein the moving means further includes a drive shaft coupled to the fixture and to the drive wheel assembly and arranged to support the fixture for pivoting movement relative to the frame during movement of the shaft means and the variable pitch pulley between said disengaged position and said engaged position.

14. The system of claim 13, wherein the shaft means includes an intermediate shaft mounted for rotation to the fixture and a fixed distance from the drive shaft and a drive sprocket mounted on the intermediate shaft and the endless chain engages the drive sprocket and a driven sprocket mounted on the drive shaft.

15. The system of claim 10, wherein the moving means further includes a control cable connected to the fixture and a tension spring interconnecting the control cable and the bail.

16. The system of claim 15, wherein the moving means further includes speed control means for selectively limiting movement of the control cable relative to the handle and the speed control means is coupled to the handle and to the control cable.

17. The system of claim 15, wherein the fixture is pivotably coupled to the frame to pivot relative to the frame during movement of the shaft means and the variable pitch pulley between said disengaged position and said engaged position.

18. A variable speed drive system for a self-propelled device having a frame, an engine coupled to the frame, a drive pulley rotated by the engine, a handle coupled to the frame, a drive wheel assembly coupled to the frame for propelling the self-propelled device, and a bail pivotably coupled to the handle for movement between an engine-idling position away from the handle and a device-moving position adjacent to the handle, the system comprising a transmission including a fixture having first and second ends, a variable pitch pulley unit rotatably coupled to the first end of the fixture, pivot means for pivotably coupling the second end of the fixture to the frame so that the fixture and the variable pitch pulley unit is pivotable relative to the frame between a forward-leaning position and a rearward-leaning position, a drive belt engaging the drive pulley and the variable pitch pulley unit and pivoting the fixture relative to the frame to draw the variable pitch pulley unit to the forward-leaning position, means for turning the drive wheel assembly to propel the self-propelled device at a certain speed only in response to tensioning the drive belt caused by pivoting movement of the fixture and variable pitch pulley unit relative to the frame and away from the forward-leaning position so that the engine moves the drive belt to rotate the variable pitch pulley unit, and cable means interconnecting the first end of the fixture and the bail for pivoting the fixture and variable pitch pulley unit from its forward-leaning position toward its rearward-leaning position in response to movement of the bail from its engine-idling position toward its device-moving position so that the drive belt engaging the engine and the variable pitch pulley unit is moved to rotate the variable pitch pulley unit and is tensioned to change the pitch of the variable pitch pulley unit causing a change in the speed of the self-propelled device.

19. The system of claim 18, wherein the pivot means includes a drive shaft coupled to the second end of the fixture and to the drive wheel assembly and the turning means includes an endless chain engaging the drive shaft and pivoting with the fixture about the drive shaft.

20. The system of claim 19, wherein the fixture is formed to include an interior region and the endless chain is positioned to lie in the interior region.

21. The system of claim 20, wherein the variable pitch pulley unit includes an intermediate shaft mounted for rotation to the first end of the fixture, a variable pitch pulley, and a drive sprocket, the intermediate shaft includes an exterior portion located outside of the interior region of the fixture and an interior portion located inside the interior region of the fixture, the variable pitch pulley unit is mounted on the exterior portion, and the drive sprocket is mounted on the interior portion and arranged to engage the endless chain and hold the endless chain in tension.

22. The system of claim 19, wherein the fixture includes a first clamshell half formed to include a longitudinally extending first central trough, a first top transverse channel intersecting the first central trough, and a first bottom transverse channel intersecting the first central trough and lying in spaced-apart relation to the first top transverse channel, the fixture further includes a second clamshell half formed to include a longitudinally extending second central trough, a second top transverse channel intersecting the second central trough, and a second bottom transverse channel intersecting the second central trough and lying in spaced-apart relation to the second top transverse channel, and the first and second clamshell halves are coupled together to trap the endless chain in the first and second central troughs and to position a portion of the intermediate shaft in the first and second top transverse channels and a portion of the drive shaft in the first and second bottom transverse channels.

23. The system of claim 22, wherein the variable pitch pulley unit includes an intermediate shaft that is positioned to extend through the first and second top transverse channels and a drive sprocket that is coupled to the drive shaft and positioned to lie in the first and second central troughs and engage the endless chain.

24. The system of claim 18, wherein the cable means further includes a control cable connected to the fixture and a tension spring interconnecting the control cable and the bail.

25. The system of claim 24, wherein the cable means further includes speed control means for selectively limiting movement of the control cable relative to the handle and the speed control means is coupled to the handle and to the control cable.

* * * * *